Jan. 6, 1970  D. H. SHOOTER ET AL  3,488,023
MOUNTING MEANS FOR A WHEEL ALIGNMENT TOOL
Filed June 12, 1967  2 Sheets-Sheet 1

INVENTORS.
DONALD H. SHOOTER
MORRIS PERELL
BY
ATTORNEY

Jan. 6, 1970  D. H. SHOOTER ET AL  3,488,023

MOUNTING MEANS FOR A WHEEL ALIGNMENT TOOL

Filed June 12, 1967  2 Sheets-Sheet 2

INVENTORS.
DONALD H. SHOOTER
MORRIS PERELL
BY
ATTORNEY

United States Patent Office 3,488,023
Patented Jan. 6, 1970

3,488,023
MOUNTING MEANS FOR A WHEEL ALIGNMENT TOOL
Donald H. Shooter and Morris Perell, both of 6226 Maywood Ave., Bell, Calif. 90201
Filed June 12, 1967, Ser. No. 645,370
Int. Cl. A47f 5/00
U.S. Cl. 248—205     6 Claims

ABSTRACT OF THE DISCLOSURE

A wheel gauge to determine alignment of the front wheels of an automobile are suitably attached to the wheel, for example, to the mounting studs which project from the brake housing. The wheel gauge is attached to a spindle threaded onto a wheel stud by means of a strong magnet which is mounted on or is attached to the spindle. Thus the wheel gauge can be very easily attached or detached from the wheel as require.

---

In order to determine the alignment of the front wheels of an automobile, it is desirable to mount the wheel gauge on a substantially uniform base on the wheel, such as the wheel mounting studs or sockets, and our mounting means can be quickly and easily attached to a wheel stud or socket after which the wheel alignment tool can be quickly attached to the mounting means by a strong magnet or the like. The mounting means includes a post or spindle which threads onto a wheel stud or into a wheel socket, depending upon the particular type of vehicle.

Camber, in an automotive vehicle wheel, is that amount in inches or degrees that each wheel is tilted outward at the top. Caster is the amount in degrees of the backward tilt of the axle and kingpin. Kingpin inclination is the amount in degrees that the tops of the kingpins are inclined toward the center line of the vehicle.

An object of our invention is to provide a simple and effective mounting means which attaches to a wheel stud or socket, the stud or socket being eccentric to the center line of the wheel.

Another object of our invention is to provide a mounting means for a wheel alignment tool or gauge which embodies magnetic means for quickly attaching the gauge to the mounting means, and where the gauge can be easily operated.

Another object of our invention is to provide a mounting means for the alignment gauge, and where the mounting means is attached to a wheel stud or socket so that the caster and kingpin inclination reading are obtained directly from the the positioned mounting means; the alignment gauge being fixed to the mounting means to obtain the correct camber, caster and toe-in reading.

Another object of our invention is to provide a mounting means of the character stated which is positive in operation, convenient in use, and quickly and easily installed in a working position and also easily disconnected therefrom. Furthermore, our mounting means is economical to manufacture, it is relatively simple, and is generally superior and serviceable.

Other objects, advantages and features of invention may appear from the accompanying drawings, the subjoined detailed description and the appended claims.

IN THE DRAWINGS

In this disclosure we have illustrated a wheel alignment tool as disclosed in Patent No. 2,645,860, dated July 21, 1953. However, other magnetically attached wheel alignment tools may be used in conjunction with our mounting means, a list of which are included in this specification.

Figure 1:
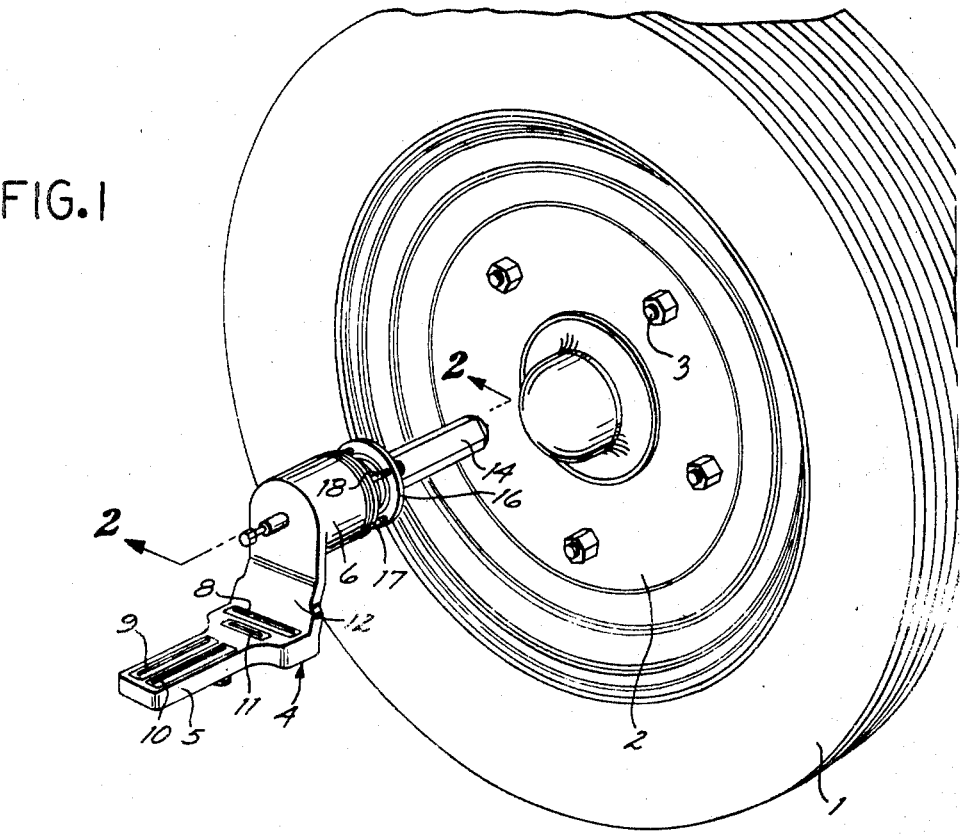
FIGURE 1 is a perspective view of our mounting means for a wheel alignment tool, the wheel assembly being of a conventional type.

As shown in FIGURE 1, a conventional front axle assembly comprises a front wheel 1 and the wheel 2 thereof. The wheel 2 is attached to the hub in a conventional manner, for example, by means of a plurality of studs 3 or threaded sockets. As disclosed in this application the gauging means 4 comprises generally a gauge plate 5 and a mounting sleeve 6, in which fixed magnets 7 are mounted. Many modern vehicle wheels are constructed of a metal which is nonferrous and, therefore, will not be attracted by the magnets 7. Consequently, we have devised a means of mounting the gauge 4 to wheels which are nonferrous in content and still provide an accurate means of determining the caster and camber of the wheel. The gauge plate 5 is recessed or grooved to receive a spirit level 8, which is fixedly held in this groove. Similarly, the plate is recessed or grooved to receive the two parallel spirit levels 9 and 10. A level indicator 11 is also mounted on the plate 5 and consists of a spirit level which determines when the plate 5 is in a level horizontal position. The spirit level 9 will give a reading of the caster of the wheel. Similarly, the spirit level 10 will give a reading of the camber of the wheel. The spirit level 8 gives a reading of the kingpin inclination. This will be subsequently described in greater detail.

In order that the gauge 4 shall pass the outer face of the hub of the wheel 2, we may offset the gauging assembly on the gauge plate 5 by means of the plate 12, which positions the gauge plate 5 below and parallel to the center line of the mounting sleeve 6. In this way it is possible to more effectively read and various levels on the gauge plate 5, as is well known in wheel aligning tools of this character.

Figure 2:
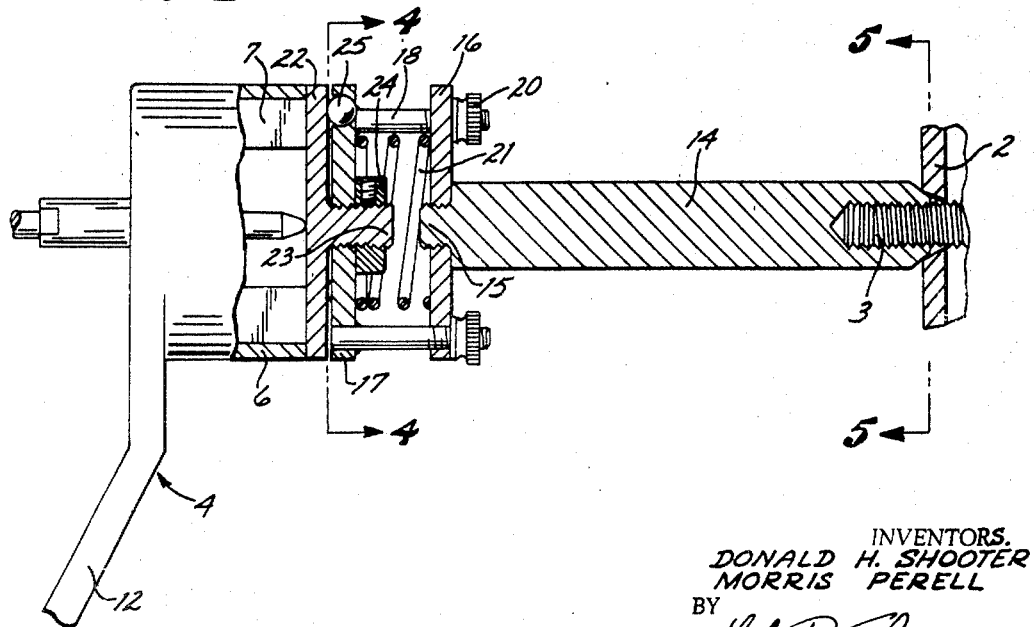
FIGURE 2 is a sectional view taken on line 2—2 of FIGURE 1.
Figure 6:
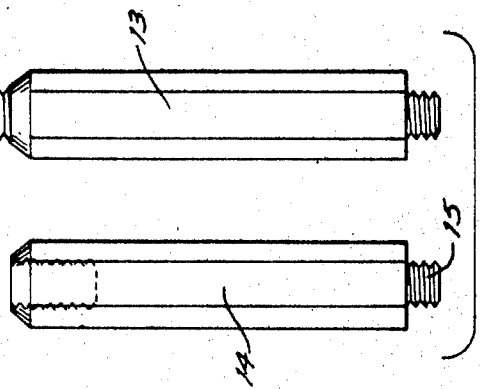
FIGURE 6 is a side elevation of two types of mounting posts.
Figure 3:
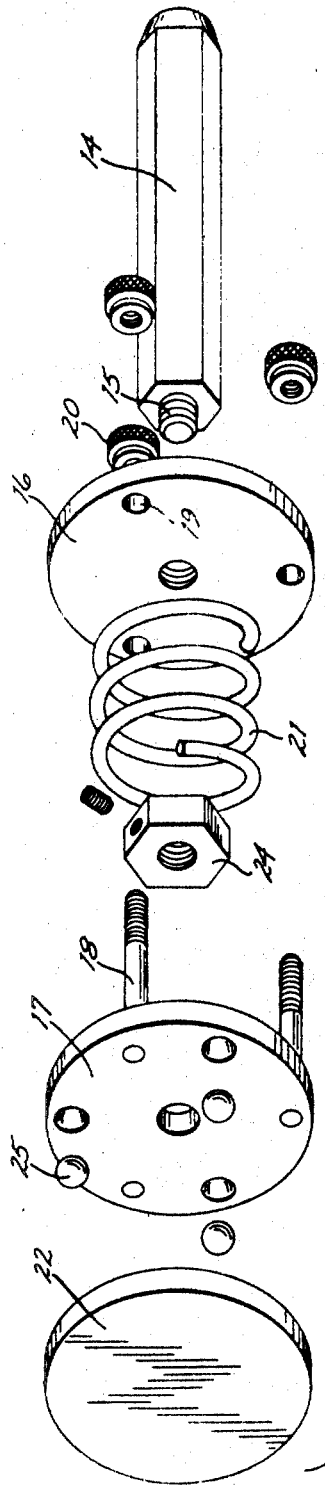
FIGURE 3 is an exploded view of our mounting means.
Figure 5:
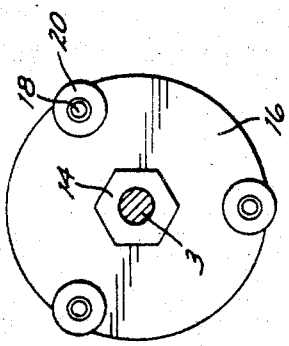
FIGURE 5 is a sectional view taken on line 5—5 of FIGURE 2.
Figure 4:
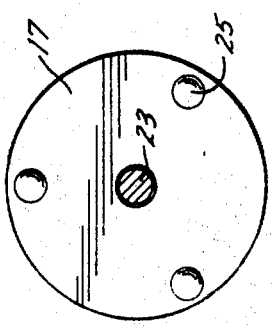
FIGURE 4 is a sectional view taken on line 4—4 of FIGURE 2.

In order to attach the gauge structure 4 to the wheel lugs or sockets 3, we provide either of the spindles 13 or 14. The spindle 13 is used when sockets are provided to mount a vehicle wheel on the brake plate or other appropriate mounting means, and the spindle 14 is used when studs 3 are employed. The spindle 14 is tightly threaded onto one of the studs 3, as shown in FIGURE 1. A threaded pin 15 is provided on the spindle 14 and this pin threads into the innermost mounting plate 16 to connect these parts. A second plate 17 is spaced from the plate 16 and these plates are parallel to each other. A plurality of adjusting pins 18 are fixedly attached at one end to the plate 17, and these pins extend through appropriate holes 19 in the plate 16. An adjusting nut 20 is threaded onto the outer end of each of the adjusting pins 18 to thus secure the two plates 16–17 in spaced relation. A coil spring 21 is positioned between the inner faces of the plates 16–17, thus yieldably pressing these two plates apart and holding them in proper spaced relation. By adjusting the nuts 20 the angle to the vertical of the plate 17 can be adjusted. A mounting disk 22 is formed of a ferrous material so that it will be attracted by the magnets 7. The mounting disk 22 is attached to the plate 17 by means of the threaded stud 23 and the nut 24 which threads thereon, and which bears against the inner face of the plate 17, as best shown in FIGURE 2.

To permit the disk 22 to rotate relative to the plate 17 in a manner to be subsequently described, we provide a plurality of ball bearings 25 which are positioned between the disk 22 and the plate 17, and which provide an anti-friction bearing surface and permit relative rotating movement between the disk 22 and the plate 17. The nut 24 is employed to adjust the disk 22 relative to the plate 17 so that proper and easy rotating movement is permitted.

IN OPERATION

The gauge mounting means is first attached to one of the studs 3 of the vehicle wheel by screwing the spindle 14 thereon. The plates 16–17 and the disk 22 have all been previously assembled on the spindle 14 in a manner shown in FIGURE 2. The wheel alignment tool, of the magnetic mounting type shown at 4, is now magnetically attached to the outer face of the disk 22 and the parts are in the position shown in FIGURE 1. When the alignment tool 4 is held stationary with one hand, the other hand can rotate the wheel 1, thus causing the wheel alignment tool to rotate with the wheel 1; however, with the alignment tool 4 always held in a position below the center line of the spindle 14. With the alignment tool 4 held against rotation around the spindle 14, the wheel 1 is rotated and one of the spirit levels 9 or 10 is observed to determine the angularity of the vertical plane of the wheel 1. The adjusting nuts 20 are now rotated to bring the plate 17 parallel to the vertical plane of the wheel 1. When this adjustment has been made, the bubble of the spirit level 9 or 10 will be substantialy stationary and the amount of camber, caster, or toe-in of the wheel 1 can be determined in the usual manner. The various bubble levels 8–9–10 and 11 are read in a usual and well known manner to read the amount of camber, caster, and toe-in, all of which is usual and well known with instruments of this type. The means to read the various positions of the wheels of the vehicle might vary with different types of wheel alignment tools or instruments. However, the method of reading the instrument would not vary because it is mounted on our mounting means instead of directly on the vehicle wheel. By adjusting the nuts 20 on the adjusting pins 18 the mounting disk 22 can be adjusted to properly position the alignment tool 4 in a proper position to read the caster, camber and toe-in angles of the wheel. Since the plate 22 is parallel to the plate 17 it also will be simultaneously adjusted when the plate 17 is adjusted as previously described.

Having described our invention, we claim:

1. A mounting means for a wheel alignment tool, said alignment tool having electromagnetic attaching means thereon, a threaded mounting means on the wheel, a spindle threaded onto said threaded mounting means, a mounting disk, said mounting disk being magnetically engaged by the alignment tool, and said means rotatably attaching said mounting disk to the spindle, including a plate adjacent the mounting disk, a second plate spaced from the first named plate, and means securing the second plate to the spindle.

2. A mounting means for a wheel alignment tool, said alignment tool having electromangetic attaching means thereon, a threaded mounting means on the wheel, a spindle threaded onto said threaded mounting means, a mounting disk, said mounting disk being magnetically engaged by the alignment tool, and said means rotatably attaching said mounting disk to the spindle, including a plate adjacent the mounting disk, and means attaching the plate to the spindle, spring means pressing against said plate and urging said plate towards the mounting disk.

3. A mounting means for a wheel alignment tool, as recited in claim 1 and said means rotatably attaching said mounting disk to the spindle, including a plate adjacent the mounting disk, a second plate spaced from the first named plate, and means securing the second plate to the spindle, and spring means pressing against said plate and urging said plate towards the mounting disk.

4. A mounting means for a wheel alignment tool as recited in claim 1, said means rotatably attaching said mounting disk to the spindle including a plate adjacent the mounting disk, a second plate spaced from the first named plate, and means securing the second plate to the spindle, and adjusting pins extending between both of the plates to tilt one plate with respect to the other.

5. A mounting means for a wheel alignment tool as recited in claim 2, said means rotatably attaching said mounting disk to the spindle including a plate adjacent the mounting disk, and means attaching the plate to the spindle, spring means pressing against said plate and urging said plate towards the mounting disk, and adjusting pins extending between both of the plates to tilt one plate with respect to the other.

6. A mounting means for a wheel alignment tool as recited in claim 1, said means rotatably attaching said mounting disk to the spindle including a plate adjacent the mounting disk, a second plate spaced from the first named plate, and means securing the second plate to the spindle, spring means pressing against said plate and urging said plate towards the mounting disk, and adjusting pins extending between both of the plates to tilt one plate with respect to the other.

References Cited

UNITED STATES PATENTS

| | | | |
|---|---|---|---|
| 1,804,490 | 5/1931 | Bagge | 33—203.18 |
| 2,623,296 | 12/1952 | Bagge et al. | 33—203.19 X |
| 2,831,265 | 4/1958 | Weaver | 33—203.18 |
| 2,958,952 | 11/1960 | Bender | 33—203.18 |
| 3,058,712 | 10/1962 | Posson | 248—205 |

ROY D. FRAZIER, Primary Examiner

J. F. FOSS, Assistant Examiner

U.S. Cl. X.R.

33—203.18